United States Patent [19]

Linden

[11] Patent Number: 4,510,816

[45] Date of Patent: Apr. 16, 1985

[54] APPARATUS FOR CHANGING THE DIRECTION OF ROTATION OF A ROTATING SHAFT

[75] Inventor: Harry A. Linden, Santa Barbara, Calif.

[73] Assignee: American Sterilizer Company, Erie, Pa.

[21] Appl. No.: 336,050

[22] Filed: Dec. 31, 1981

[51] Int. Cl.³ .............................. F16H 3/08; F16H 3/14
[52] U.S. Cl. ........................................ 74/372; 74/378; 74/323
[58] Field of Search ................ 74/322, 323, 324, 378, 74/371, 372; 192/96, 48-91, 21

[56] References Cited

U.S. PATENT DOCUMENTS

| | | | |
|---|---|---|---|
| 1,177,661 | 4/1916 | Svensson | 74/378 |
| 2,243,035 | 5/1941 | Hilkemeier | 74/378 |
| 2,602,347 | 7/1952 | Miller | 74/378 |
| 2,623,490 | 12/1952 | Kiekhaefer | 74/378 |
| 3,707,884 | 1/1973 | Go | 74/372 |
| 3,818,855 | 6/1974 | Schimanckas | 74/378 |
| 4,349,091 | 9/1982 | Miyake et al. | 192/21 |
| 4,395,240 | 7/1983 | Blanchard | 74/372 |

FOREIGN PATENT DOCUMENTS

| | | | |
|---|---|---|---|
| 103311 | 12/1962 | Netherlands | 192/96 |
| 2057073 | 3/1981 | United Kingdom | 192/21 |

*Primary Examiner*—Allan D. Herrmann
*Assistant Examiner*—Dirk Wright
*Attorney, Agent, or Firm*—Robert D. Yeager; Andrew J. Cornelius

[57] ABSTRACT

The present invention provides apparatus for changing the direction of rotation of a rotating shaft without changing the direction of rotation of the motor driving the shaft. The present invention includes a drive gear which causes two driven bevel gears to rotate in opposite directions. A control shaft having cam surfaces selectively forces one of two sets of balls into engagement with one of the driven gears to couple that gear with the driven shaft to rotate the shaft in one direction. Rotation of the driven shaft is reversed by changing the position of the control shaft which uncouples one set of balls from the driven shaft and couples the remaining set of balls to the driven shaft.

5 Claims, 4 Drawing Figures

APPARATUS FOR CHANGING THE DIRECTION OF ROTATION OF A ROTATING SHAFT

BACKGROUND OF THE INVENTION

1. Field of the Invention

The present invention relates generally to rotating shafts and, more particularly, to apparatus for changing the direction of rotation of a rotating shaft.

2. Description of the Prior Art

Generally, conventional apparatus for changing the direction of rotation of a rotating shaft, or shaft reversers, are of one of two types. Shaft reversers of one type reverse the direction of rotation of a shaft by reversing the direction of rotation of the motor which drives the shaft. Such shaft changers are complex and costly. In a second type of shaft reverser, the driven shaft must be moved along its longitudinal axis to effect a reversal of rotation of the driven shaft. Such shaft reversers are undesirable for use in many applications such as in orthopedic surgical instruments which are used for drilling, reaming, screwing, and driving pins.

Accordingly, there exists a need for a device for reversing the direction of rotation of a rotating shaft under power that does not require linear movement of the driven shaft. Or reversal of the direction of rotation of the drive shaft of the motor to reverse the direction of rotation of the driven shaft.

SUMMARY OF THE INVENTION

The present invention provides apparatus for changing the direction of rotation of a driven shaft. The apparatus includes a frame to which the shaft is mounted for rotation about its longitudinal axis. Two members are disposed on the shaft for rotational movement thereabout and apparatus is provided that engages the members and rotates each member in a direction opposite to that of the other member. The present invention also includes apparatus for mechanically and selectively coupling one of the members to the shaft to rotate the shaft in the direction in which the coupled member is rotated. The direction of rotation of the shaft is reversed when the coupled member is uncoupled from the shaft and the uncoupled member is subsequently coupled to the shaft. The two members can be a pair of bevel gears. The engaging and rotating apparatus can be a driver bevel gear which engages and rotates the driven bevel gears.

The coupling apparatus can be two spherical members, each spherical member so disposed as to permit each spherical member to assume an engaged position in which the spherical member can transfer to the driven shaft the force supplied to one of the driven bevel gears and an unengaged position in which such transfer of force is not possible. Apparatus is also provided for moving each spherical member to and from each such position. The moving apparatus can be a control cam shaft disposed within the driven shaft for longitudinal movement relative to the driven shaft. The cam surface of the control shaft is in contact with each spherical member with longitudinal movement of the control shaft causing the cam surface to move the spherical members between the engaged and unengaged positions.

Accordingly, the present invention provides apparatus for changing the direction of rotation of a driven shaft which does not require reversing the motor driving the shaft and which does not require linear movement of the driven shaft along its longitudinal axis.

BRIEF DESCRIPTION OF THE DRAWINGS

The following DETAILED DESCRIPTION OF THE PREFERRED EMBODIMENT can be understood better if reference is made to the drawings, in which.

DETAILED DESCRIPTION OF THE PREFERRED EMBODIMENTS

Figure 1:
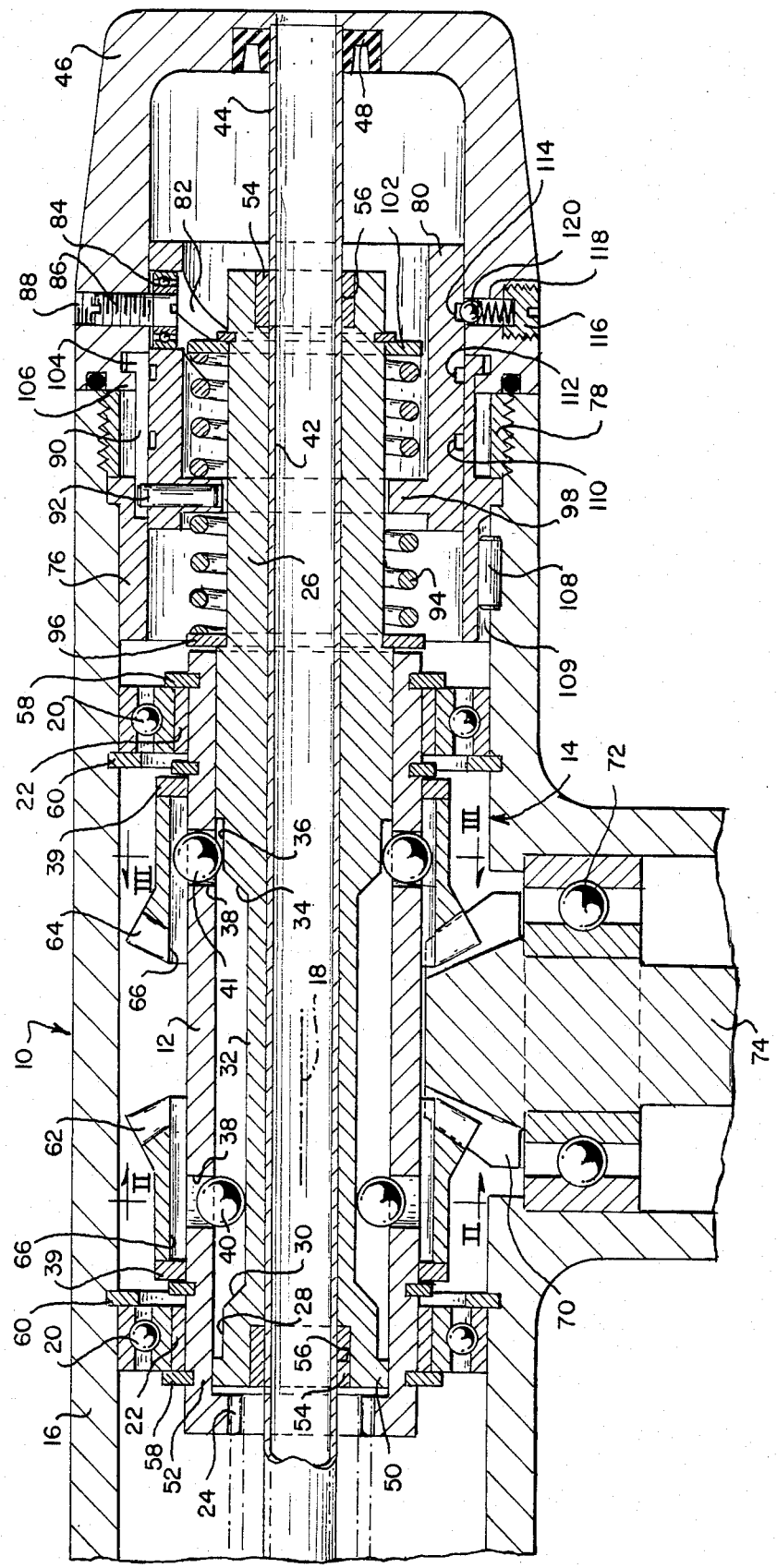
FIG. 1 is a cross-sectional view of a medical instrument including apparatus constructed according to the provisions of the present invention.
Figure 2:
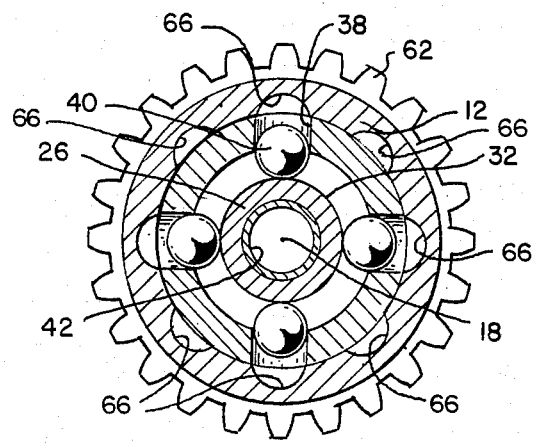
FIG. 2 is a transverse view of the instrument shown in FIG. 1 taken along the line II—II with the balls in the unengaged position.
Figure 3:
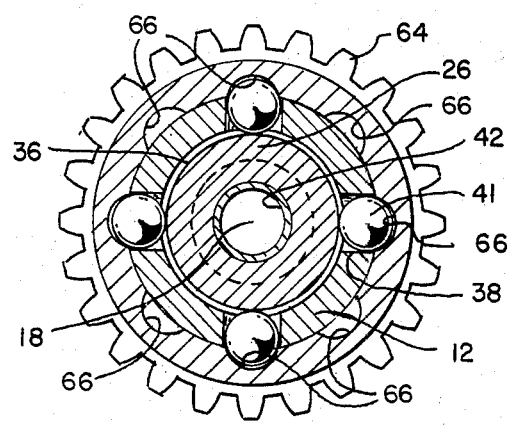
FIG. 3 is a transverse view of the instrument shown in FIG. 1 taken along the line III—III with the balls in the engaged position.
Figure 4:
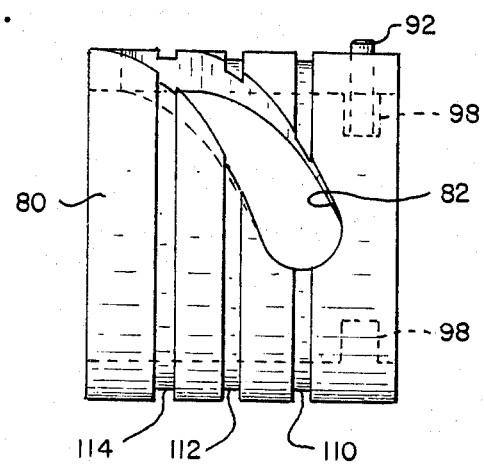
FIG. 4 is a side elevational view of the cam member of the apparatus shown in FIG. 1.

FIG. 1 shows a portion of a motor operated medical instrument 10 having a driven shaft 12 the direction of rotation of which is controlled by the shaft direction changer 14, the preferred embodiment of the present invention.

Shaft 12 is mounted within housing 16 of instrument 10 for rotational movement therein about its longitudinal axis 18 by two bearings 20 and spacers 22. One end of shaft 12 includes spline 24 to which a spline shaft having the operating head of the instrument can be coupled.

Shaft changer 14 includes a control shaft 26 having an outer cam surface that includes cam surfaces 28, 30, 32, 34 and 36. Driven shaft 12 defines eight openings 38 each of which is adapted to receive a metal ball 40 or 41. Cam surfaces 28, 30, 32, 34 and 36 move balls 40 or 41 radially into or out of openings 38 when control shaft 26 is moved along longitudinal axis 18. A tubular guard 42 is disposed partially within control shaft 26. One end 44 of tubular guard 42 is mounted to cap 46 of housing 16 and sealed with a seal 48. Tubular guard 42 receives a surgical pin or wire (not shown) used in orthopedic surgical procedure. Flanged end 50 of control shaft 26 bears against the inner surface of end 52 of driven shaft 12 to support flanged end 50. A bushing 54 is disposed within each opening 56 formed in the ends of control shaft 26. Circlips 58 and spacers 60 position bearings 20 and spacers 22 to prevent longitudinal movement of driven shaft 12.

A pair of bevel gears 62 and 64 are mounted on the outer surface of driven shaft 12 and can rotate thereabout. Each bevel gear 62 and 64 includes eight semi-circular grooves 66 which are formed through the length of each bevel gear 62 and 64 and spaced equally around its circumference. When a cam surface 28 or 36 forces a ball 40 or 41 into an opening 38, a portion of ball 40 or 41 projects into groove 66. When a ball 40 or 41 projects into a groove 66 and the bevel gear in which such groove is formed is rotated, groove 66 engages the portion of ball 40 or 41 projecting into it and causes ball 40 or 41 and shaft 12 to rotate about axis 18. Driver bevel gear 70 is mounted with bearing 72 within housing 16 for rotational movement. Shaft 74 of driver gear 70 is coupled to a suitable power source such as an electric motor which is capable of rotating gear 70. Driver gear 70 is so mounted within housing 16 that it engages both bevel gears 62 and 64 and causes them to rotate in opposite directions when driven gear 70 is rotated. Accordingly, shaft 12 rotates in a first direction when control shaft 26 is moved to a position in which cam surface 28 forces balls 40 into openings 38 and grooves 66, thereby coupling bevel gear 62 to driven shaft 12 and enabling bevel gear 62 to rotate driven shaft 12. Driven shaft 12 is rotated in the opposite direction when control shaft 26 is moved to a position in which cam surface 36 forces balls 41 into openings 38 and grooves 66 thereby coupling bevel gear 64 to driven shaft 12 and enabling level gear 64 to rotate driven shaft 12.

The cam surfaces of control shaft 26 are so formed as to prevent both sets of balls 40 and 41 to couple gears 62 and 64 to driven shaft 12 at the same time. However, control shaft 26 can be so positioned along its axis 18 as to permit both sets of balls 40 and 41 to be resting on cam surface 32, in which position driven shaft 12 is coupled to neither gear 62 nor 64 and does not rotate.

Movement of control shaft 26 along its axis 18 is effected by rotating cap 46 relative to the remainder of housing 16. A guide sleeve 76 is secured within housing 16 with a threaded insert 78. Cam member 80, having a cam surface 82, is secured partially within guide sleeve 76 with a bearing 84 and set screw 86 which is threaded into opening 88 of cap 46. Guide sleeve 76 includes a slot 90 within which a pin 92 projecting out of cam member 80 can travel. A spring 94 is disposed around control shaft 26 between washer 96 and flanged portion 98 of cam member 80. A second spring 100 is disposed around control shaft 26 between flanged portion 98 of cam member 80 and washer 102. Cap 46 is secured to instrument 10 by flange 104 formed on guide sleeve 76. Flange 104 extends only around a portion of the end of guide sleeve 76 and flange 106 extends only around a portion of the periphery of the end of cap 46 to permit cap 46 to be secured to instrument 10 by pressing flange 106 against the end of housing 16 where flange 104 is not present and then rotating cap 46 until flanges 104 and 106 mate. A pin 108 is secured to the inner surface of housing 16 and includes a groove 109 formed in guide sleeve 76 to restrict its movement.

Three annular rings 110, 112 and 114 are formed in the outer surface of cam member 80. A set screw 116 supports a spring 118 which urges a ball 120 toward guide sleeve 76. A portion of ball 120 can project within a ring 110, 112 or 114 when ball 120 is aligned therewith to provide a stable position for cam member 80. Shaft 12 rotates in a first direction when ball 120 is disposed partly within ring 110 and rotates in a second direction when ball 120 is partly disposed within ring 114. When ball 120 is disposed within ring 112, shaft 12 is in its neutral position and cannot rotate.

Operation of instrument 110 is as follows. FIG. 1 shows control shaft 26 in a position in which driven shaft 12 can be rotated in the second direction as described above. When control shaft 26 is in the position shown in FIG. 1, balls 41 extend through openings 38 and into grooves 66 of bevel gear 64. Driver gear 70 rotates both bevel gears 62 and 64. When balls 41 are in the position shown in FIG. 1, rotation of bevel gear 64 causes grooves 66 of bevel gear 64 to bear against a portion of balls 41 and rotate balls 41 and shaft 12 in the second direction. Balls 40 do not project through openings 38 and into grooves 66 of gear 62 and do not drive shaft 12.

To change the direction of rotation of shaft 12 from the second direction to the first direction, cap 46 is rotated in the clockwise about axis 18. Rotation of cap 46 in the clockwise direction causes bearing 84 to slide down cam surface 82 of cam member 80 and force cam member 80 and control shaft 26 toward cap 46 against the force of spring 100. When ring 112 of cam member 80 becomes aligned with ball 120, both sets of balls 40 and 41 rest on cam surface 32 of control shaft 26 and do not engage gears 62 or 64. In such a position, neither gear 62 nor 64 can rotate shaft 12 and shaft 12 is in its neutral position. Further rotation of cap 46 causes bearing 84 to travel further down cam surface 82 and move cam member 80 and control shaft 26 further towards cap 46. When ball 120 becomes aligned with ring 110, balls 41 rest on cam surface 32 of control shaft 26 and do not extend into grooves 66 of bevel gear 64 thus preventing bevel gear 64 from rotating shaft 12. Balls 40 are pushed through openings 38 and into grooves 66 of bevel gear 62 by cam surfaces 30 and 28 and permit rotating bevel gear 62 to rotate shaft 12 in the first direction. Shaft 12 can be caused to reverse direction again by rotating cap 46 in a counter clockwise direction until ball 120 becomes aligned with ring 114 of cam member 80.

What is claimed is:

1. Apparatus for changing the direction of rotation of a driven shaft comprising:
    a frame to which the shaft is mounted for rotation about its longitudinal axis;
    two members disposed on the shaft for rotational movement thereabout;
    means for engaging said members and rotating each said member in a direction opposite to that of the other said member;
    means for mechanically coupling a first said member to the shaft when said coupling means assumes a first position relative to said frame to permit said first member to rotate the shaft in a first direction, and for mechanically coupling a second said member to the shaft when said coupling means assumes a second position relative to said frame to permit the second member to rotate the shaft in a second direction, said coupling means remaining rotationally stationary with respect to said frame when the driven shaft rotates;
    means for mounting said coupling means to said frame to permit movement of said coupling means between its two said positions and to prevent rotation of said coupling means about its longitudinal axis relative to said frame; and
    means for moving said coupling means between its two said positions.

2. The apparatus recited in claim 1 wherein said engaging and rotating means includes a driving bevel gear and each said member is a driven bevel gear, said driving bevel gear being mounted to the frame for rotational movement and adapted to engage and rotate said driven bevel gears when said driving bevel gear is rotated.

3. The apparatus recited in claim 1 wherein said coupling means includes two spherical members, each said spherical member so disposed as to permit said spherical member to assume an engaged position in which said spherical member can transfer to the shaft force applied to one said driven bevel gear and an unengaged position in which said transfer of force cannot occur, and means for moving each said spherical member to and from each of its said positions.

4. The apparatus recited in claim 3 wherein the shaft defines two openings each of which is adapted to receive a said spherical member when said spherical member is in its engaged position, a portion of said spherical member being capable of contacting a surface of one said member when said spherical member is disposed within a shaft opening and said member is rotated and transferring force applied to said member to the shaft.

5. Apparatus for changing the direction of rotation of a driven shaft which defines a pair of openings comprising:
- a frame to which the shaft is mounted for rotation about its longitudinal axis;
- a pair of bevel gears mounted on the shaft for rotational movement about the shaft;
- a driving bevel gear that engages said bevel gears and rotates said bevel gears in opposite directions;
- a pair of spherical members, each said spherical member being so disposed as to permit said spherical member to assume an engaged position in which said spherical member is disposed at least partially within a driven shaft opening and in contact with a said bevel gear to transfer to the shaft force applied to said bevel gear and an unengaged position in which said transfer of force cannot occur;
- a control shaft so mounted to said frame as to permit longitudinal movement of said control shaft relative to the driven shaft and to prevent rotation of said control shaft about its longitudinal axis relative to said frame when the driven shaft rotates, the surface of said control shaft moving said spherical members between their engaged and unengaged positions when said control shaft is moved longitudinally relative to said driven shaft; and
- means for moving said control shaft between its said positions.

* * * * *

UNITED STATES PATENT AND TRADEMARK OFFICE
CERTIFICATE OF CORRECTION

PATENT NO. : 4,510,816

DATED : April 16, 1985

INVENTOR(S) : Harry A. Linden

It is certified that error appears in the above—identified patent and that said Letters Patent is hereby corrected as shown below:

```
Col. 3, line 12, delete "level" and substitute
        therefor --bevel--.
```

Signed and Sealed this

Fifth Day of November 1985

[SEAL]

Attest:

Attesting Officer

DONALD J. QUIGG

Commissioner of Patents and Trademarks